United States Patent
Wang et al.

(10) Patent No.: US 8,897,226 B2
(45) Date of Patent: Nov. 25, 2014

(54) METHOD AND DEVICE FOR REPORTING MAXIMUM POWER OF CARRIER IN CARRIER AGGREGATION SCENARIO

(75) Inventors: Jian Wang, Shenzhen (CN); Yada Huang, Shenzhen (CN); Zhongda Du, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/576,430

(22) PCT Filed: Sep. 23, 2011

(86) PCT No.: PCT/CN2011/080106
§ 371 (c)(1),
(2), (4) Date: Aug. 1, 2012

(87) PCT Pub. No.: WO2012/062155
PCT Pub. Date: May 18, 2012

(65) Prior Publication Data
US 2013/0215824 A1  Aug. 22, 2013

(30) Foreign Application Priority Data
Nov. 12, 2010 (CN) .......................... 2010 1 0543116

(51) Int. Cl.
*H04L 1/00* (2006.01)
*H04J 1/16* (2006.01)
*G08C 15/00* (2006.01)
*G06F 11/00* (2006.01)
*G01R 31/08* (2006.01)

(52) U.S. Cl.
USPC ........... 370/328; 370/252; 370/318; 370/329; 455/552

(58) Field of Classification Search
USPC ................. 370/252–280, 318–328, 336–341; 455/450–464, 507–522
See application file for complete search history.

(56) References Cited

U.S. PATENT DOCUMENTS 8,223,708 B2 * 7/2012 Guo .............................. 370/329
8,315,320 B2 * 11/2012 Zhang et al. ................... 375/260

(Continued)

FOREIGN PATENT DOCUMENTS

| CN | 1845628 A | 10/2006 |
| CN | 101808360 A | 8/2010 |
| CN | 102083131 A | 6/2011 |
| WO | 2012/059249 A1 | 5/2012 |

OTHER PUBLICATIONS

3GPP TSG RAN WG1 Meeting #62, R1-104675, Madrid, Spain Aug. 23-27, 2010, ZTE, Entitled Power Headroom Reporting for Carrier Aggregation in LTE-Advanced.

(Continued)

*Primary Examiner* — M. Phan
(74) *Attorney, Agent, or Firm* — Banner & Witcoff, Ltd.

(57) ABSTRACT

A method and apparatus for reporting a maximum carrier power in a carrier aggregation scenario are disclosed. The method includes: a user equipment (UE) encapsulating a particular power headroom (PH) of an activated uplink component carrier (UL CC) and a particular maximum output power of a physical channel of the activated UL CC into a same power headroom report (PHR) and reporting the PHR to a base station (eNB). The method enables the eNB to acquire the power situation of the UE in time so as to perform scheduling more accurately.

16 Claims, 2 Drawing Sheets

| R | R | R | 1 | 0 | 0 | 0 | 1 | OCT1 (Bit figure) |
|---|---|---|---|---|---|---|---|---|
| PH1 CC1 ||||||||  OCT2 |
| Pcmax,c1 CC1 |||| PH2 CC1 |||| OCT3 |
| Pcmax,c2 CC1 ||||||||  OCT4 |
| PH1 CC5 ||||||||  OCT5 |
| Pcmax,c1 CC5 |||| Padding |||| OCT6 |

(56) References Cited

U.S. PATENT DOCUMENTS

| | | | |
|---|---|---|---|
| 8,437,798 B2* | 5/2013 | Fabien et al. | 455/552.1 |
| 8,565,146 B2* | 10/2013 | Zhang et al. | 370/318 |
| 8,626,225 B2* | 1/2014 | Heo et al. | 455/522 |
| 8,649,349 B2* | 2/2014 | Wang | 370/329 |
| 2009/0175187 A1* | 7/2009 | Jersenius et al. | 370/252 |
| 2009/0318180 A1* | 12/2009 | Yi et al. | 455/522 |
| 2011/0038271 A1* | 2/2011 | Shin et al. | 370/252 |
| 2012/0224535 A1* | 9/2012 | Kim et al. | 370/328 |
| 2012/0314603 A1* | 12/2012 | Wen et al. | 370/252 |
| 2013/0215849 A1* | 8/2013 | Heo et al. | 370/329 |

OTHER PUBLICATIONS

3GPP TSG RAN WG2 #72, R2106418, Jacksonville, Florida, Nov. 9-12, 2010, InterDigital, Entitled MAC-CE PHR Format and PCMAX.

3GPP TSG RAN WG2 #71bis, Tdoc R2-105462, Xian, China Oct. 11-Oct. 15, 2010, Ericsson, Entitled Summary of E-Mail Discussion (71 #57) LTE CA: PHR Reporting.

3GPP TSG RAN WG2 Meeting #72, R2-106203, Jacksonville, USA, Nov. 15-19, 2010, MediaTek, Entitled Open Issues for PCMAX Reporting.

3GPP TSG RAN WG2 #72, R2-106417, Jacksonville, Florida, Nov. 8-12, 2010, InterDigital, Entitled MAC PHR Contents.

International Search Report dated Dec. 22, 2011 for PCT/CN2011/080106.

3GPP TSG RAN WG1 Meeting #62, Madrid, Spain, Aug. 23-27, 2010, ZTE, Power Headroom Reporting for Carrier Aggregation in LTE-Advanced, 4 pages.

\* cited by examiner

| R | R | R | 1 | 0 | 0 | 0 | 1 | OCT1 (Bit figure) |
|---|---|---|---|---|---|---|---|---|
| PH1 CC1 ||||||| | OCT2 |
| Pcmax,c1 CC1 |||| PH2 CC1 |||| OCT3 |
| | Pcmax,c2 CC1 |||||||  OCT4 |
| PH1 CC5 ||||||| | OCT5 |
| Pcmax,c1CC5 |||| Padding |||| OCT6 |

FIG. 1

| R | R | R | 1 | 0 | 0 | 0 | 1 | OCT1 (Bit figure) |
|---|---|---|---|---|---|---|---|---|
| PH1 CC1 ||||||| | OCT2 |
| Pcmax,c1 CC1 |||| PH2 CC1 |||| OCT3 |
| | Pcmax,c2 CC1 ||||||| OCT4 |
| PH1 CC5 ||||||| | OCT5 |

FIG. 2

| R | R | R | 1 | 0 | 0 | 0 | 1 | OCT1 (Bit figure) |
|---|---|---|---|---|---|---|---|---|
| PH1 CC1 ||||||| | OCT2 |
| Pcmax,c1 CC1 |||| PH2 CC1 |||| OCT3 |
| | Pcmax,c2 CC1 ||||||| OCT4 |
| PH1 CC5 ||||||| | OCT5 |

FIG. 3

| R | R | R | 1 | 0 | 0 | 0 | 1 | OCT1 (Bit figure)
|---|---|---|---|---|---|---|---|
| PH1 CC1 ||||||| | OCT2 |
| Pcmax,c1 CC1 |||| PH2 CC1 ||||  OCT3 |
| | PH1 CC5 ||||||| OCT4 |

FIG. 4

| R | R | R | 1 | 0 | 0 | 0 | 1 | OCT1 (Bit figure)
|---|---|---|---|---|---|---|---|
| PH1 CC1 ||||||| | OCT2 |
| PH2 CC1 |||| Pcmax,c2 CC1 ||||  OCT3 |
| | PH1 CC5 ||||||| OCT4 |

FIG. 5

| R | R | R | 1 | 0 | 0 | 0 | 1 | OCT1 (Bit figure)
|---|---|---|---|---|---|---|---|
| PH1 CC1 ||||||| | OCT2 |
| PH2 CC1 ||||| | | OCT3 |
| | PH1 CC5 ||||||| OCT4 |
| | Pcmax,c1 CC5 |||||| | OCT5 |

FIG. 6

METHOD AND DEVICE FOR REPORTING MAXIMUM POWER OF CARRIER IN CARRIER AGGREGATION SCENARIO

TECHNICAL FIELD

The present invention relates to Long Term Evolution-Advanced technology of the mobile communication system, and in particular, to a method and apparatus for reporting a maximum carrier power in a carrier aggregation scenario in the Long Term Evolution-Advanced technology.

BACKGROUND OF THE RELATED ART

The Long Term Evolution (abbreviated as LTE) is an advanced broadband wireless access technology developed by the 3rd Generation Partner Project (3GPP), which can support a single carrier bandwidth up to 20M, reaches 50 Mbps uplink speed and 100 Mbps downlink speed, and have a low time delay, already has the characteristic of the fourth generation mobile communication, and is a Beyond 3G technology. Above the LTE standard, the 3GPP has developed the long term evolution advanced (abbreviated as LTE-A), and developed a series of technology, such as the carrier aggregation, the multi-input multi-output (abbreviated as MIMO) at higher stage, relay, multi-point co-processing (comp), etc., to meet the requirement of the fourth generation mobile communication system defined by the international mobile telecommunication-advanced (IMT-ADVANCED) of the international telecommunications union-radio department (ITU-R), such as, the uplink speed of 500 Mbps, and the downlink speed of 1 Gbps. The Carrier Aggregation (CA) is to support much higher throughput by collecting the frequency range locating at same frequency band (band) or different bands. Under the REL-10 version of the carrier aggregation, different carriers are compatible for REL-8/REL-9 of the LTE, that is, being the cell with the full function. Wherein, the cell where one carrier locates is called the Primary cell (Pcell), and others are called the Secondary cell (Scell). The Pcell is different from the Scell: the Pcell is responsible for the special functions, such as, establishing the Radio Resource Control (RRC) connection, the security parameter, receiving the paging message, updating the system information, scheduling the carrier of other cell, the transmission of the uplink feedback, etc.; the function of the Scell is comparatively simple, and can be regarded as the frequency band resource that assists the Pcell in completing the communication task, but it has certain independence, including receiving the scheduling signaling independently, performing the power control independently, etc. Since the particularity of the Pcell, when the UE is in the radio resource control-connected (RRC-connected) state, the Pcell will be activated forever, that is, no matter the UE or the eNB can use it in time. While the Scell is regarded as the auxiliary cell, in some time periods, there is no uplink or downlink transmission taken place, and in these time periods, the Scell is in a deactivated state. Since the time-frequency resource used by the LTE/LTE-A UE is scheduled by the eNB, the eNB is required to obtain the information of the UE to schedule the uplink time-frequency resource correctly, meanwhile, the eNB requires the information of the UE to perform correct uplink power control as well to make the UE reach the target QoS and decrease the problems of the interference among the same frequency cells of the LTE/LTE-A to a certain extent. The information of the UE includes the Sounding Reference Signal (SRS) and the power redundancy information such as the power headroom report (PHR), etc. The former reflects the channel quality of the uplink carrier, and the latter reflects the power redundancy of the uplink carrier. The eNB can select the location of the time-frequency block according to the channel quality, and can select the quantity of the time-frequency blocks and select the modulation format, etc., according to the power-redundancy. In the REL-8/REL-9 specification, the user equipment triggers the PHR, and meets the transmission condition, and then the UE needs to send the PHR MAC CE. In the REL-10 specification, if the Scell is in the deactivated state, the UE does not need to report the PHR for the Scell. So, the trigger events of the user equipment includes the trigger event of the REL-8/REL-9 and the activate event. That is, if the UE triggers the PHR report when the cycle PHR timer is due or if the path loss of the component carrier changes much or when the PHR is configured/reconfigured, or the PHR will be triggered when the Scell is activated, that is, the Scell turns from the deactivated state into the activated state, and the PHR will be sent after the UE obtains sufficient uplink resource. Because of the carrier aggregation and each Scell uses the independent power control process, each Scell will report the PH respectively. The transmission of the Up-Link Primary Component Carrier (UL PCC) of the UE of carrier aggregation for the physical uplink control channel (PUCCH) and the physical uplink shared channel (PUSCH) has two possible modes: (1) mode 1: the PUCCH is transmitted at a different time from the PUSCH of the UL PCC, which is same as the REL-8/REL-9. (2) mode 2: the PUCCH is transmitted at the same time with the PUSCH of the Up-Link Secondary Component Carrier (UL SCC). As to the mode 1, when the PHR is transmitted, no matter the UL PCC or the UL SCC only need to report the Type1 PHR. The Type1 PHR is defined as the total power of the UL PCC deducted by the transmission power of the PUSCH channel, for example:

$$\text{Type1 PHR:PH1}=P_{cmaxc}-P_{pusch} \qquad \text{formula 1}$$

As to the mode 2, when the PHR is transmitted, for the UL SCC, it only needs to transmit the Type1 PHR; as to the UL PCC, the UE needs to report the Type1 PHR and the Type2 PHR. The Type2 PHR is defined as the total power of the UL PCC deducted by the transmission power of the PUSCH channel and the transmission power of the PUCCH channel, for example:

$$\text{Type2 PHR: PH1}=P_{cmaxc}-P_{pucch}-P_{pusch} \qquad \text{formula 2}$$

wherein, the $P_{cmaxc}$ is the maximum output power of the UL PCC, the $P_{pucch}$ is the transmission power of the PUCCH of the UL PCC, and the $P_{pusch}$ is the transmission power of the PUSCH of the UL PCC.

When the PHR is transmitted, there is no uplink transmission on the activated Scell, then the UE will send the virtual PHR for the Scell, and the virtual PHR uses the PUSCH format of the reference format. If there is no uplink transmission on the Pcell, then the UE will send the virtual type1 PHR for the Pcell, that is, the type1 PHR uses the PUSCH format of the reference format; if there is no PUCCH on the Pcell, then the virtual type2 PHR needs to be sent, and the type2 PHR will use the PUCCH format of the reference format. These two kinds of reference formats are already defined, which can be referred to the 3GPP 36.321 serial standards.

The $P_{cmax}$ in formula 1 and formula 2 is the particular maximum power of the cell, and is related to the RF characteristic specification of the UE and the maximum power specified by the cell. Wherein, the UE cannot exceed the maximum power specified by the cell. The RF characteristic of the UE includes the power constraint condition, such as, the MPR and the A-MPR. The Maximum Power Reduction (abbreviated as MPR) and the Additional-Maximum Power Reduction (abbreviated as A-MPR), etc., change with the scheduling, which causes the $P_{cmax}$ to change as well. The UE needs to notify the $P_{cmax}$ to the eNB, to enable the eNB to acquire the power situation of the UE, in order to schedule more accurately. But there is no solution on how to report the maximum carrier power in the carrier aggregation scenario yet.

Content of the Invention

The technical problem to be solve by the present invention is to provide a method and an apparatus for reporting a maximum carrier power in a carrier aggregation scenario, so as to enable the eNB to acquire the power situation of UE in time.

To solve the above technical problem, the present invention provides a method for reporting a maximum carrier power in a carrier aggregation scenario, and the method comprises:

a user equipment (UE) encapsulating a particular power headroom (PH) of an activated uplink component carrier (UL CC) and a particular maximum output power of a physical channel of the activated UL CC into a same power headroom report (PHR) and reporting the PHR to a base station (eNB).

The above method may have the following features:

the step of the UE encapsulating the particular PH of the activated UL CC and the particular maximum output power of the physical channel of the activated UL CC into a same PHR and reporting the PHR to the eNB comprises: the UE reporting a particular maximum output power of the physical channel of all activated UL CCs.

The above method may have the following features:

a cell where the UL CC locates comprises a primary cell and a secondary cell;

the step of the UE reporting the particular maximum output power of the physical channel of all activated UL CCs comprises:

the UE, for the activated UL CC in the primary cell, in a transmission mode that a physical uplink control channel (PUCCH) and a physical uplink shared channel (PUSCH) are transmitted at the same time, reporting a maximum output power of the physical channel which is used for calculating a type 1PH of the UL CC and a maximum output power of the physical channel which is used for calculating a type 2PH of the UL CC; in a transmission mode that the PUCCH and the PUSCH are transmitted at different times, reporting a maximum output power of the physical channel which is used for calculating the type 1PH of the UL CC; and the UE, for the activated UL CC in the secondary cell, in a transmission mode that the PUCCH and the PUSCH are transmitted at the same time or at different times, reporting a maximum output power of the physical channel which is used for calculating the type 1PH of the UL CC.

The above method may have the following features:

the step of the UE encapsulating the particular PH of the activated UL CC and the particular maximum output power of the physical channel of the activated UL CC into a same PHR and reporting the PHR to the eNB comprises: the UE reporting a maximum output power of the physical channel of all activated UL CCs which have data scheduling.

The above method may have the following features:

a cell where the UL CC locates comprises a primary cell and a secondary cell;

the step of the UE reporting a maximum output power of the physical channel of the UL CCs which have data scheduling comprises:

the UE, for the activated UL CC in the primary cell, in the transmission mode that the PUCCH and the PUSCH are transmitted at the same time, if there is a PUSCH and/or PUCCH on the UL CC, reporting a maximum output power of the physical channel which is used for calculating a type 1PH of the UL CC and the maximum output power of the physical channel which is used for calculating a type 2PH of the UL CC; in a transmission mode that the PUCCH and the PUSCH are transmitted at different times, if there is a PUSCH on the UL CC, reporting a maximum output power of the physical channel which is used for calculating the type 1PH of the UL CC; and the UE, for the activated UL CC in the secondary cell, in a transmission mode that the PUCCH and the PUSCH are transmitted at the same time or at different times, if there is a PUSCH on the UL_CC, reporting a maximum output power of the physical channel which is used for calculating the type 1PH of the UL CC.

The above method may have the following features:

a cell where the UL CC locates comprises a primary cell and a secondary cell;

the step of the UE reporting a maximum output power of the physical channel of the UL CCs which have data scheduling comprises:

the UE, for the activated UL CC in the primary cell, in the transmission mode that the PUCCH and the PUSCH are transmitted at the same time, if there is a PUSCH and a PUCCH on the UL CC, then reporting a maximum output power of the physical channel which is used for calculating a type 1PH of the UL CC and the maximum output power of the physical channel which is used for calculating a type 2PH of the UL CC; if there is only a PUSCH transmitted on the UL CC, then only reporting the maximum output power of the physical channel which is used for calculating the type 1PH of the UL CC; if there is only a PUCCH transmitted on the UL CC, then only reporting the maximum output power of the physical channel which is used for calculating the type 2PH of the UL CC; in a transmission mode that the PUCCH and the PUSCH are transmitted at different times, if there is a PUSCH on the UL CC, then reporting a maximum output power of the physical channel which is used for calculating the type 1PH of the UL CC; and the UE, for the activated UL CC in the secondary cell, in a transmission mode that the PUCCH and the PUSCH are transmitted at the same time or at different times, if there is a PUSCH on the UL CC, then reporting a maximum output power of the physical channel which is used for calculating the type 1PH of the UL CC.

The above method may have the following features:

the step of the UE encapsulating the particular PH of the activated UL CC and the particular maximum output power of the physical channel of the activated UL CC into a same PHR and reporting the PHR to the eNB comprises: the UE respectively encapsulating the particular maximum output power of the physical channel of each UL CC after the particular PH of each UL CC when encapsulating the PHR.

The above method may further comprises:

the UE further encapsulating indication information of a cell state in the PHR to indicate a transmission mode of the primary cell and/or whether the secondary cell is in an activated state; wherein, the transmission mode comprises: a transmission mode that the PUCCH and the PUSCH are transmitted at the same time, and a transmission mode that the PUCCH and the PUSCH are transmitted at different times.

The present invention also provides an apparatus for reporting a maximum carrier power in a carrier aggregation scenario, comprising a processing module and a sending module, wherein, the processing module is configured to: encapsulate a particular power headroom (PH) of an activated uplink component carrier (UL CC) and a particular maximum output power of a physical channel of the activated UL CC into a same power headroom report (PHR); and the sending module is configured to: send out the PHR.

The above apparatus may have the following features:

the processing module is configured to: encapsulate the maximum output power of the physical channel of all activated UL CCs into the PHR.

The above apparatus may have the following features:

a cell where the UL CC locates comprises a primary cell and a secondary cell;

the processing module is configured to encapsulate the maximum output power of the physical channel of all activated UL CCs into the PHR according to the following way:

for the activated UL CC in the primary cell, in a transmission mode that a physical uplink control channel (PUCCH) and a physical uplink shared channel (PUSCH) are transmitted at the same time, encapsulating a maximum output power of the physical channel which is used for calculating a type 1PH of the UL CC and a maximum output power of the physical channel which is used for calculating a type 2PH of the UL CC into the PHR; in a transmission mode that the PUCCH and the PUSCH are transmitted at different times, encapsulating a maximum output power of the physical channel which is used for calculating the type 1PH of the UL CC into the PHR; and for the activated UL CC in the secondary cell, in a transmission mode that the PUCCH and the PUSCH are transmitted at the same time or at different times, encapsulating a maximum output power of the physical channel which is used for calculating the type 1PH of the UL CC into the PHR.

The above apparatus may have the following features:

the processing module is configured to encapsulate the maximum output power of the physical channel in all activated UL CCs which have data scheduling into the PHR.

The above apparatus may have the following features:

a cell where the UL CC locates comprises a primary cell and a secondary cell;

the processing module is configured to encapsulate the maximum output power of the physical channel of the UL CCs which have data scheduling into the PHR according to the following way:

for the activated UL CC in the primary cell, in the transmission mode that the PUCCH and the PUSCH are transmitted at the same time, if there is a PUSCH and/or PUCCH on the ULCC, then encapsulating a maximum output power of the physical channel which is used for calculating a type 1PH of the UL CC and the maximum output power of the physical channel which is used for calculating a type 2PH of the UL CC into the PHR; in a transmission mode that the PUCCH and the PUSCH are transmitted at different times, if there is a PUSCH on the UL CC, then encapsulating a maximum output power of the physical channel which is used for calculating the type 1PH of the UL CC into the PHR; and for the activated UL CC in the secondary cell, in a transmission mode that the PUCCH and the PUSCH are transmitted at the same time or at different times, if there is a PUSCH on the UL CC, then encapsulating a maximum output power of the physical channel which is used for calculating the type 1PH of the UL CC into the PHR.

The above apparatus may have the following features:

a cell where the UL CC locates comprises a primary cell and a secondary cell;

the processing module is configured to encapsulate the maximum output power of the physical channel in all activated UL CCs which have data scheduling into the PHR according to the following way:

for the activated UL CC in the primary cell, in the transmission mode that the PUCCH and the PUSCH are transmitted at the same time, if there is a PUSCH and a PUCCH on the ULCC, then encapsulating a maximum output power of the physical channel which is used for calculating a type 1PH of the UL CC and the maximum output power of the physical channel which is used for calculating a type 2PH of the UL CC into the PHR; if there is only a PUSCH transmitted on the ULCC, then encapsulating the maximum output power of the physical channel which is used for calculating the type 1PH of the UL CC into the PHR; if there is only a PUCCH transmitted on the ULCC, then encapsulating the maximum output power of the physical channel which is used for calculating the type 2PH of the UL CC into the PHR; in a transmission mode that the PUCCH and the PUSCH are transmitted at different times, if there is a PUSCH on the ULCC, then encapsulating a maximum output power of the physical channel which is used for calculating the type 1PH of the UL CC into the PHR; and for the activated UL CC in the secondary cell, in a transmission mode that the PUCCH and the PUSCH are transmitted at the same time or at different times, if there is a PUSCH on the UL CC, then encapsulating a maximum output power of the physical channel which is used for calculating the type 1PH of the UL CC.

The above apparatus may have the following features:

the processing module is configured to respectively encapsulate the particular maximum output power of the physical channel of each UL CC after the particular PH of each UL CC when encapsulating the PHR.

The above apparatus may have the following features:

the processing module is further configured to encapsulate indication information of a cell state in the PHR to indicate a transmission mode of the primary cell and/or whether the secondary cell is in an activated state; and the transmission mode comprises: a transmission mode that the PUCCH and the PUSCH are transmitted at the same time, and a transmission mode that the PUCCH and the PUSCH are transmitted at different times.

The above method and apparatus for reporting the maximum carrier power in carrier aggregation scenario enables the eNB to acquire the power situation of the UE in time.

BRIEF DESCRIPTION OF DRAWINGS

FIG. 1 is a schematic diagram of a method for reporting a maximum carrier power in a carrier aggregation scenario according to application example one of the present invention;

FIG. 2 is a schematic diagram of a method for reporting a maximum carrier power in a carrier aggregation scenario according to application example two of the present invention;

FIG. 3 is a schematic diagram of a method for reporting a maximum carrier power in a carrier aggregation scenario according to application example three of the present invention;

FIG. 4 is a schematic diagram of a method for reporting a maximum carrier power in a carrier aggregation scenario according to application example four of the present invention;

FIG. 5 is a schematic diagram of a method for reporting a maximum carrier power in a carrier aggregation scenario according to application example five of the present invention;

FIG. 6 is a schematic diagram of a method for reporting a maximum carrier power in a carrier aggregation scenario according to application example six of the present invention.

PREFERRED EMBODIMENTS OF THE PRESENT INVENTION

The embodiment of the present invention provides a method for reporting a maximum carrier power in a carrier aggregation scenario, including: a user equipment (UE) encapsulating a particular power headroom (PH)/particular power headrooms (PHs) (there may be one or more PHs) of an activated uplink component carrier (UL CC) and a particular maximum output power of a physical channel of the activated UL CC into a same power headroom report (PHR) and reporting the PHR to a base station (eNB). That is, when reporting the particular PH(s) of the UL CC, reporting a particular maximum output power of a physical channel of the activated UL CC simultaneously.

Each UL CC has its own PH(s), each PH has its own maximum output power, and the particular maximum output power of the physical channel refers to that the existence of the maximum output power of the above-mentioned PH is corresponding to the existence of the physical channel.

The cell based on where the UL CC locates includes a primary cell and a secondary cell, and the primary cell and the secondary cell have different functions. The PHs reported by the UL CC located in the primary cell and the UL CC located in the secondary cell are different to some extent as well. The embodiment of the present invention provides the following solutions here:

Embodiment I the UE reports the particular maximum output power of the physical channel of all activated UL CCs. The specific implementation scheme can be that:

the UE, for the activated UL CC in the primary cell, in a transmission mode that the PUCCH and the PUSCH are transmitted at the same time, reports a maximum output power of the physical channel which is used for calculating a type 1PH of the UL CC and a maximum output power of the physical channel which is used for calculating a type 2PH of the UL CC; in a transmission mode that the PUCCH and the PUSCH are transmitted at different times, reports a maximum output power of the physical channel which is used for calculating the type 1PH of the UL CC.

The UE, for the activated UL CC in the secondary cell, in a transmission mode that the PUCCH and the PUSCH are transmitted at the same time or at different times, reports a maximum output power of the physical channel which is used for calculating the type 1PH of the UL CC.

Embodiment II the UE reports the maximum output power of the physical channel of all activated UL CCs which have data scheduling. The specific implementation scheme can be that:

the UE, for the activated UL CC in the primary cell, in the transmission mode that the PUCCH and the PUSCH are transmitted at the same time, if there is a PUSCH and/or PUCCH on the UL CC, reports a maximum output power of the physical channel which is used for calculating a type 1PH of the UL CC and the maximum output power of the physical channel which is used for calculating a type 2PH of the UL CC; in a transmission mode that the PUCCH and the PUSCH are transmitted at different times, if there is a PUSCH on the UL CC, reports a maximum output power of the physical channel which is used for calculating the type 1PH of the UL CC.

The UE, for the activated UL CC in the secondary cell, in a transmission mode that the PUCCH and the PUSCH are transmitted at the same time or at different times, if there is a PUSCH on the UL CC, reports a maximum output power of the physical channel which is used for calculating the type 1PH of the UL CC.

Embodiment III the UE reports the maximum output power of the physical channel of all activated UL CCs which have data scheduling. The specific implementation scheme can be that:

the UE, for the activated UL CC in the primary cell, in the transmission mode that the PUCCH and the PUSCH are transmitted at the same time, if there is a PUSCH and a PUCCH on the UL CC, then reports a maximum output power of the physical channel which is used for calculating a type 1PH of the UL CC and the maximum output power of the physical channel which is used for calculating a type 2PH of the UL CC; if there is only a PUSCH transmitted on the UL CC, then only reports the maximum output power of the physical channel which is used for calculating the type 1PH of the UL CC; if there is only a PUCCH transmitted on the UL CC, then only reports the maximum output power of the physical channel which is used for calculating the type 2PH of the UL CC; in a transmission mode that the PUCCH and the PUSCH are transmitted at different times, if there is a PUSCH on the UL CC, then reports a maximum output power of the physical channel which is used for calculating the type 1PH of the UL CC.

The UE, for the activated UL CC in the secondary cell, in a transmission mode that the PUCCH and the PUSCH are transmitted at the same time or at different times, if there is a PUSCH on the UL CC, then reports a maximum output power of the physical channel which is used for calculating the type 1PH of the UL CC.

The difference between embodiment three and embodiment two lies in that: if there is only a PUSCH transmitted on the UL CC, then it only reports the maximum output power of the physical channel which is used for calculating the type 1PH of the UL CC, and does not report the maximum output power of the physical channel which is used for calculating the type 2PH of the UL CC. That is, the maximum output power of the physical channel which is used for calculating the type 1PH of the UL CC can be used by default as the maximum output power of the physical channel which is used for calculating the type 2PH of the UL CC, that is, the two are equal by default. Similarly, if there is only a PUCCH transmitted on the UL CC, then it only reports the maximum output power of the physical channel which is used for calculating the type 2PH of the UL CC, and does not report the maximum output power of the physical channel which is used for calculating the type 1PH of the UL CC. That is, the maximum output power of the physical channel which is used for calculating the type 2PH of the UL CC can used by default as the maximum output power of the physical channel which is used for calculating the type 1PH of the UL CC, that is, the two are equal by default.

Embodiment IV the UE respectively encapsulates the particular maximum output power of the physical channel of each UL CC after the particular power headroom (PH) of each UL CC when encapsulating the PHR. Thus, without needing any indication information, it can know the particular maximum output power of the physical channel reported in the PHR is of which CC. For example, the PH of the CC1 and the maximum output power of its physical channel required to be reported are: PH1 CC1, $P_{cmax,\,c1}$; and the PH of the CC2 and the maximum output power of its physical channel required to be reported are: PH1 CC2, $P_{cmax,\,c2}$. Accordingly, when encapsulating the PHR, the encapsulation order can be: PH1 CC1, $P_{cmax,\,c1}$, PH1 CC2, $P_{cmax,\,c2}$. That is, the particular maximum output power of the physical channel of the CC1 is after the PH of the CC1.

Embodiment V Five the UE encapsulates the indication information of the cell state in the PHR to indicate a transmission mode of the primary cell and/or whether the secondary cell is in an activated state. The transmission mode includes: a transmission mode that the PUCCH and the PUSCH are transmitted at the same time, and a transmission mode that the PUCCH and the PUSCH are transmitted at different times.

For the purpose of further illustration, the embodiment of the present invention provides an example of an indication way: 5 bits of a first byte in the PHR can be used to indicate the state of cell 1, cell 2, cell 3, cell 4 and cell 5 respectively. Wherein, the cell 1 is the primary cell, and other cells are the secondary cells. If the bit corresponding to the cell 1 is 0, then it represents that the transmission mode of the cell 1 is the transmission mode that the PUCCH and the PUSCH are transmitted at different time; if the bit corresponding to the cell 1 is 1, then it represents that the transmission mode of the cell 1 is the transmission mode that the PUCCH and the PUSCH are transmitted at the same time. If the bit corresponding to cell 2, 3, 4 and 5 is 0, then it represents that the cell is in a deactivated state; if being 1, then it represents that the cell is in an activated state. If the cell is in the activated state, then the CC in the cell is in the activated state as well.

Of course, those skilled in the art can combine the technical features recorded by the above-mentioned embodiments at will as required, such as combining embodiment I with embodiments IV and V.

In order to better illustrate the embodiment of the present invention, it is described in detail with reference to some specific application examples hereinafter.

Application Example I

The UE activates two UL CCs: the UL CC1 and the UL CC5. Wherein, the UL CC1 is Pcell, and the UL CC5 is Scell. This application example adopts the reporting way described in embodiment I.

The PH1 CC1 is the type1 PH of the UL CC1, and the PH2 CC1 is the type2 PH of the UL CC1. The $P_{cmax,\,c1}$ CC1 is the maximum output power of the physical channel which is used for calculating the type 1 PH of the UL CC1. The $P_{cmax,\,c2}$ CC1 is the maximum output power of the physical channel which is used for calculating the type 2PH of the UL CC1. When there is only a PUCCH on the UL CC1, the $P_{cmax,\,c1}$ CC1 and the $P_{cmax,\,c2}$ CC1 are calculated according to the PUCCH of the UL CC1. The PH1 CC1 is calculated according to reference PUSCH and the $P_{cmax,\,c1}$ CC1, and the PH2 CC1 is calculated according to reference PUSCH, real PUCCH and the $P_{cmax,\,c2}$ CC1.

There is no actually scheduled PUSCH on the UL CC5, and the UL CC5 calculates the $P_{cmax,c1}$ CC5 according to the PUCCH and the PUSCH of other CC, which refers to that $P_{cmax,c1}$ CC5 is calculated according to the PUCCH and the PUSCH of the CC1 in the present application example. The PH1 CC5 is the type1 PH of the UL CC5. The PH1 CC5 is calculated and obtained according to the reference PUSCH and the $P_{cmax,c1}$ CC5.

Referring to FIG. 1, the reporting way is: encapsulating the PH1 CC1, $P_{cmax,c1}$ CC1, PH2 CC1, $P_{cmax,c2}$ CC1, PH1 CC5, $P_{cmax,c1}$ CC5 into the PHR in an order, and 5 bits of a first field in the PHR is used to indicate the state of cell 1, cell 2, cell 3, cell 4 and cell 5 respectively. The cell 1 is the primary cell, and other cells are the secondary cells. If the bit corresponding to the cell 1 is 1, then it represents that the transmission mode of the cell 1 is the transmission mode that the PUCCH and the PUSCH are transmitted at the same time. If the bit corresponding to the cell 5 is 1, it represents that the cell 5 is activated.

Application Example II

The UE activates two UL CCs: the UL CC1 and the UL CC5. Wherein, the UL CC1 is Pcell, and the UL CC5 is Scell. There is a PUCCH and/or PUSCH on the UL CC1. There is no actually scheduled PUSCH on the UL CC5. This application example adopts the reporting way described in embodiment two.

The UE calculates the $P_{cmax,\,c1}$ CC1 and $P_{cmax,\,c2}$ CC1 of the Pcell. If there is only a PUSCH on the UL CC of the Pcell, then the type1 PH of UL CC1 is calculated according to the PUSCH and the $P_{cmax,\,c1}$ CC1, that is, the PH1 CC1; the type2 PH of UL CC1 is calculated according to PUSCH, the reference PUCCH and the $P_{cmax,\,c2}$ CC1, that is, the PH2 CC1. If there is only PUCCH, then the type1 PH of UL CC1 is calculated according to the reference PUSCH and the $P_{cmax,\,c1}$ CC1, that is, the PH1 CC1, and the type2 PH of UL CC1 is calculated according to the reference PUSCH, the PUCCH and the $P_{cmax,\,c2}$ CC1, that is, the PH2 CC1. If there is the PUSCH and also the PUCCH, then the type1 PH of UL CC1 is calculated according to the PUSCH and the $P_{cmax,\,c1}$ CC1, that is, the PH1 CC1, and the type2 PH of UL CC1 is calculated according to the PUSCH, the PUCCH and the $P_{cmax,\,c2}$ CC1, that is, the PH2 CC1.

There is no actually scheduled PUSCH on the UL CC5, and the particular maximum output power of the physical channel of the UL CC5 $P_{cmax,c1}$ CC5 is not reported.

Referring to FIG. 2, the reporting way is: encapsulating the PH1 CC1, $P_{cmax,\,c1}$ CC1, PH2 CC1, $P_{cmax,\,c2}$ CC1, PH1 CC5 into the PHR in an order, and 5 bits of a first field in the PHR is used to indicate the state of cell 1, cell 2, cell 3, cell 4 and cell 5 respectively. The cell 1 is the primary cell, and other cells are the secondary cells. If the bit corresponding to the cell 1 is 1, then it represents that the transmission mode of the cell 1 is the transmission mode that the PUCCH and the PUSCH are transmitted at the same time. If the bit corresponding to the cell 5 is 1, it represents that the cell 5 is activated.

Application Example III

The UE activates two UL CCs: the UL CC1 and the UL CC5. Wherein, the UL CC1 is Pcell, and the UL CC5 is Scell. There are both transmission of the PUCCH and that of the PUSCH in the Pcell, while there is no transmission in the Scell. The application example adopts the reporting way of embodiment III.

When there is the PUCCH and the PUSCH on the UL CC1, the UL CC1 reports the $P_{cmax,c1}$ CC 1 and $P_{cmax,c2}$ CC1.

The PH1 CC1 is the type1 PH of the UL CC1, and is obtained by calculation according to the PUSCH and the $P_{cmax,c1}$ CC1. The PH2 CC1 is the type2 PH of the UL CC1, and is obtained by calculation according to the PUCCH, the PUSCH, and the $P_{cmax,c2}$ CC1.

There is no actually scheduled PUSCH on the UL CC5, and its type1 PH is obtained by calculation according to the reference PUSCH. The particular maximum output power of the physical channel of the UL CC5 $P_{cmax,c1}$ CC5 is not reported.

Referring to FIG. 3, the reporting way is: encapsulating the PH1 CC1, $P_{cmax,c1}$ CC1, PH2 CC1, $P_{cmax,c2}$ CC1, PH1 CC5 into the PHR in an order, and the last 5 bits of a first field in the PHR is used to indicate the state of cell 1, cell 2, cell 3, cell 4 and cell 5 respectively. The cell 1 is the primary cell, and other cells are the secondary cells. If the bit corresponding to the cell 1 is 1, then it represents that the transmission mode of the cell 1 is the transmission mode that the PUCCH and the PUSCH are transmitted at the same time. If the bit corresponding to the cell 5 is 1, it represents that the cell 5 is activated.

Application Example IV

The UE activates two UL CCs: the UL CC1 and the UL CC5. Wherein, the UL CC1 is Pcell, and the UL CC5 is Scell. There is only the PUSCH transmitted in the Pcell, and there is no transmission in the Scell. This application example adopts the reporting way described in embodiment III.

When there is only the PUSCH on the UL CC1, the UL CC1 reports the $P_{cmax,c1}$ CC1.

The PH1 CC1 is the type1 PH of the UL CC1, and is obtained by calculation according to the PUSCH and the $P_{cmax,c1}$ CC1. The PH2 CC1 is the type2 PH of the UL CC1, and is obtained by calculation according to the virtual reference PUCCH, PUSCH, and the $P_{cmax,c1}$ CC1.

There is no actually scheduled PUSCH on the UL CC5, and its type1 PH is obtained by calculation according to the reference PUSCH. The particular maximum output power of the physical channel of the UL CC5 $P_{cmax,c1}$ CC5 is not reported.

Referring to FIG. 4, the reporting way is: encapsulating the PH1 CC1, $P_{cmax,c1}$ CC1, PH2 CC1, PH1 CC5 into the PHR in an order, and the last 5 bits of a first field in the PHR is used to indicate the state of cell 1, cell 2, cell 3, cell 4 and cell 5 respectively. The cell 1 is the primary cell, and other cells are the secondary cells. If the bit corresponding to the cell 1 is 1, then it represents that the transmission mode of the cell 1 is the transmission mode that the PUCCH and the PUSCH are transmitted at the same time. If the bit corresponding to the cell 5 is 1, it represents that the cell 5 is activated.

Application Example V

The UE activates two UL CCs: the UL CC1 and the UL CC5. Wherein, the UL CC1 is Pcell, and the UL CC5 is Scell. There is only the PUCCH transmitted on the Pcell, and there is no transmission on the Scell. This application example adopts the reporting way described in embodiment III.

When there is only the PUCCH on the UL CC1, the UL CC1 reports the $P_{cmax,c2}$ CC1.

The PH1 CC1 is the type1 PH of the UL CC1, and is obtained by calculation according to the reference PUSCH and the $P_{cmax,c2}$ CC1. The PH2 CC1 is the type2 PH of the UL CC1, and is obtained by calculation according to the PUCCH, the reference PUSCH, and the $P_{cmax,c2}$ CC1.

There is no actually scheduled PUSCH on the UL CC5, and its type1 PH is obtained by calculation according to the reference PUSCH. The particular maximum output power of the physical channel of the UL CC5 $P_{cmax,c1}$ CC5 is not reported.

Referring to FIG. 5, the reporting way is: encapsulating the PH1 CC1, PH2 CC1, $P_{cmax,c2}$ CC1, PH1 CC5 into the PHR in an order, and the last 5 bits of a first field in the PHR is used to indicate the state of cell 1, cell 2, cell 3, cell 4 and cell 5 respectively. The cell 1 is the primary cell, and other cells are the secondary cells. If the bit corresponding to the cell 1 is 1, then it represents that the transmission mode of the cell 1 is the transmission mode that the PUCCH and the PUSCH are transmitted at the same time. If the bit corresponding to the cell 5 is 1, it represents that the cell 5 is activated.

Application Example VI

The UE activates two UL CCs: the UL CC1 and the UL CC5. Wherein, the UL CC1 is Pcell, and the UL CC5 is Scell. There is no transmission on the Pcell, and there is transmission on the Scell. This application example adopts the reporting way described in embodiment III.

When there is no transmission on the UL CC1, the UL CC1 does not report the $P_{cmax,c1}$ CC1.

The PH1 CC1 is the type1 PH of the UL CC1, and is obtained by calculation according to the reference PUSCH and the nominal maximum power. The nominal maximum power is the smaller of the maximum power of the cell provide by the UE and eNB respectively, and it is a constant.

The PH2 CC2 is the type1 PH of the UL CC2, and is obtained by calculation according to the reference PUSCH, the reference PUCCH, and the nominal maximum power.

There is actually scheduled PUSCH on the UL CC5, and its type 1 PH is obtained by calculation according to the PUSCH. And the $P_{cmax,c1}$ CC5 is not reported.

Referring to FIG. 6, the reporting way is: encapsulating the PH1 CC1, PH2 CC1, PH1 CC5 and $P_{cmax,c1}$ CC5 into the PHR in an order, and the last 5 bits of a first field in the PHR is used to indicate the state of cell 1, cell 2, cell 3, cell 4 and cell 5 respectively. The cell 1 is the primary cell, and other cells are the secondary cells. If the bit corresponding to the cell 1 is 1, then it represents that the transmission mode of the cell 1 is the transmission mode that the PUCCH and the PUSCH are transmitted at the same time. If the bit corresponding to the cell 5 is 1, it represents that the cell 5 is activated.

In order to implement the above-mentioned method, the present invention further provides an apparatus for reporting a maximum carrier power in a carrier aggregation scenario, including a processing module and a sending module, wherein, the processing module is configured to: encapsulate a particular power headroom (PH) of an activated uplink component carrier (UL CC) and a particular maximum output power of a physical channel of the activated UL CC into a same power headroom report (PHR); and the sending module is configured to: send out the PHR.

By adopting the above-mentioned apparatus, when reporting the particular PH(s) of the UL CC, the particular maximum output power of the physical channel of the UL CC is reported together.

Considering that the cell where the UL CC locates includes the primary cell and the secondary cell, and the primary and secondary cells have different functions. The PHs reported by the UL CC locating in the primary cell and the UL CC locating in the secondary cell are different to some extent. Preferably, the following specific solutions are provided:

in one embodiment, the particular maximum output power of the physical channel of the UL CC encapsulated by the processing module is the maximum output power of the physical channel of all activated UL CCs.

In the specific implementation, the particular maximum output power of the physical channel of the UL CC encapsulated by the processing module can include that:

for the activated UL CC in the primary cell, in a transmission mode that a physical uplink control channel (PUCCH) and a physical uplink shared channel (PUSCH) are transmitted at the same time, a maximum output power of the physical channel which is used for calculating a type 1PH of the UL CC and a maximum output power of the physical channel which is used for calculating a type 2PH of the UL CC are encapsulated; in a transmission mode that the PUCCH and the PUSCH are transmitted at different times, a maximum output power of the physical channel which is used for calculating the type 1PH of the UL CC is encapsulated; and for the activated UL CC in the secondary cell, in a transmission mode that the PUCCH and the PUSCH are transmitted at the same time or at different times, a maximum output power of the physical channel which is used for calculating the type 1PH of the UL CC is encapsulated.

In another embodiment, the particular maximum output power of the physical channel of the UL CC encapsulated by the processing module is the maximum output power of the physical channel in all activated UL CCs which have data scheduling.

In the specific implementation, the particular maximum output power of the physical channel of the UL CC encapsulated by the processing module can include that:

for the activated UL CC in the primary cell, in the transmission mode that the PUCCH and the PUSCH are transmitted at the same time, if there is a PUSCH and/or PUCCH on the ULCC, then a maximum output power of the physical channel which is used for calculating a type 1PH of the UL CC and the maximum output power of the physical channel which is used for calculating a type 2PH of the UL CC are encapsulated; in a transmission mode that the PUCCH and the PUSCH are transmitted at different times, if there is a PUSCH on the UL CC, then a maximum output power of the physical channel which is used for calculating the type 1PH of the UL CC is encapsulated; and for the activated UL CC in the secondary cell, in a transmission mode that the PUCCH and the PUSCH are transmitted at the same time or at different times, if there is a PUSCH on the ULCC, then a maximum output power of the physical channel which is used for calculating the type 1PH of the UL CC is encapsulated.

In another embodiment, the particular maximum output power of the physical channel of the UL CC encapsulated by the processing module is the maximum output power of the physical channel in all activated UL CCs which have data scheduling.

In the specific implementation, the particular maximum output power of the physical channel of the UL CC encapsulated by the processing module can include that:

for the activated UL CC in the primary cell, in the transmission mode that the PUCCH and the PUSCH are transmitted at the same time, if there is a PUSCH and a PUCCH on the UL CC, then a maximum output power of the physical channel which is used for calculating a type 1PH of the UL CC and the maximum output power of the physical channel which is used for calculating a type 2PH of the UL CC are encapsulated; if there is only a PUSCH transmitted on the UL CC, then the maximum output power of the physical channel which is used for calculating the type 1PH of the UL CC is encapsulated; if there is only a PUCCH transmitted on the UL CC, then the maximum output power of the physical channel which is used for calculating the type 2PH of the UL CC is encapsulated; in a transmission mode that the PUCCH and the PUSCH are transmitted at different times, if there is a PUSCH on the UL CC, then a maximum output power of the physical channel which is used for calculating the type 1PH of the UL CC is encapsulated; and the UE, for the activated UL CC in the secondary cell, in a transmission mode that the PUCCH and the PUSCH are transmitted at the same time or at different times, if there is a PUSCH on the ULCC, then encapsulates a maximum output power of the physical channel which is used for calculating the type 1PH of the UL CC.

Preferably, the processing module is configured to be able to respectively encapsulate the particular maximum output power of the physical channel of each UL CC after the particular power headroom (PH(s)) of each UL CC when encapsulating the PHR.

Preferably, the processing module is further configured to encapsulate indication information of a cell state in the PHR to indicate a transmission mode of the primary cell and/or whether the secondary cell is in an activated state. The transmission mode includes: a transmission mode that the PUCCH and the PUSCH are transmitted at the same time, and a transmission mode that the PUCCH and the PUSCH are transmitted at different times.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limit to any specific form of the combination of the hardware and software.

The above description is only the preferred embodiments of the present invention and is not intended to limit the present invention. For those skilled in the art, the present invention can have various modifications and variations. All of modifications, equivalents, improvements etc. without departing from the spirit and essence of the present invention should be fallen into the protection scope of the present invention.

INDUSTRIAL APPLICABILITY

The above-mentioned embodiments enable the eNB to acquire the power situation of the UE in time.

What is claimed is:

1. A method for reporting a maximum carrier power in a carrier aggregation scenario, comprising:
   a user equipment (UE) encapsulating a particular power headroom (PH) of an activated uplink component carrier (UL CC) and a particular maximum output power of a physical channel of the activated UL CC into a same power headroom report (PHR) and reporting the PHR to a base station (eNB), wherein the step of the UE encapsulating the particular PH of the activated UL CC and the particular maximum output power of the physical channel of the activated UL CC into the same PHR and reporting the PHR to the eNB comprises: the UE reporting the particular maximum output power of the physical channel of all activated UL CCs; and wherein
   a cell where the UL CC locates comprises a primary cell and a secondary cell;
   the step of the UE reporting the particular maximum output power of the physical channel of all activated UL CCs comprises:

the UE, for the activated UL CC in the primary cell, in a transmission mode that a physical uplink control channel (PUCCH) and a physical uplink shared channel (PUSCH) are transmitted at the same time, reporting a maximum output power of the physical channel which is used for calculating a type 1PH of the UL CC and a maximum output power of the physical channel which is used for calculating a type 2PH of the UL CC; in a transmission mode that the PUCCH and the PUSCH are transmitted at different times, reporting the maximum output power of the physical channel which is used for calculating the type 1PH of the UL CC; and the UE, for the activated UL CC in the secondary cell, in a transmission mode that the PUCCH and the PUSCH are transmitted at the same time or at different times, reporting the maximum output power of the physical channel which is used for calculating the type 1PH of the UL CC.

2. The method according to claim 1, wherein,
the step of the UE encapsulating the particular PH of the activated UL CC and the particular maximum output power of the physical channel of the activated UL CC into a same PHR and reporting the PHR to the eNB comprises: the UE reporting a maximum output power of the physical channel of all activated UL CCs which have data scheduling.

3. The method according to claim 2, wherein,
the step of the UE reporting the maximum output power of the physical channel of the UL CCs which have data scheduling comprises:
the UE, for the activated UL CC in the primary cell, in the transmission mode that the PUCCH and the PUSCH are transmitted at the same time, if there is a PUSCH and/or PUCCH on the UL CC, reporting the maximum output power of the physical channel which is used for calculating the type 1PH of the UL CC and the maximum output power of the physical channel which is used for calculating the type 2PH of the UL CC; in the transmission mode that the PUCCH and the PUSCH are transmitted at different times, if there is a PUSCH on the UL CC, reporting the maximum output power of the physical channel which is used for calculating the type 1PH of the UL CC; and
the UE, for the activated UL CC in the secondary cell, in the transmission mode that the PUCCH and the PUSCH are transmitted at the same time or at different times, if there is a PUSCH on the ULCC, reporting the maximum output power of the physical channel which is used for calculating the type 1PH of the UL CC.

4. The method according to claim 2, wherein,
the step of the UE reporting a maximum output power of the physical channel of the UL CCs which have data scheduling comprises:
the UE, for the activated UL CC in the primary cell, in the transmission mode that the PUCCH and the PUSCH are transmitted at the same time, if there is a PUSCH and a PUCCH on the UL CC, then reporting the maximum output power of the physical channel which is used for calculating the type 1PH of the UL CC and the maximum output power of the physical channel which is used for calculating the type 2PH of the UL CC; if there is only a PUSCH transmitted on the UL CC, then only reporting the maximum output power of the physical channel which is used for calculating the type 1PH of the UL CC; if there is only a PUCCH transmitted on the UL CC, then only reporting the maximum output power of the physical channel which is used for calculating the type 2PH of the UL CC; in the transmission mode that the PUCCH and the PUSCH are transmitted at different times, if there is a PUSCH on the UL CC, then reporting the maximum output power of the physical channel which is used for calculating the type 1PH of the UL CC; and the UE, for the activated UL CC in the secondary cell, in the transmission mode that the PUCCH and the PUSCH are transmitted at the same time or at different times, if there is a PUSCH on the UL CC, then reporting the maximum output power of the physical channel which is used for calculating the type 1PH of the UL CC.

5. The method according to claim 1, wherein,
the step of the UE encapsulating the particular PH of the activated UL CC and the particular maximum output power of the physical channel of the activated UL CC into a same PHR and reporting the PHR to the eNB comprises: the UE respectively encapsulating the particular maximum output power of the physical channel of each UL CC after the particular PH of each UL CC when encapsulating the PHR.

6. The method according to claim 1, further comprising:
the UE further encapsulating indication information of a cell state in the PHR to indicate a transmission mode of the primary cell and/or whether the secondary cell is in an activated state; wherein,
the transmission mode comprises: the transmission mode that the PUCCH and the PUSCH are transmitted at the same time, and the transmission mode that the PUCCH and the PUSCH are transmitted at different times.

7. An apparatus for reporting a maximum carrier power in a carrier aggregation scenario, comprising a processor and a storage device, wherein the storage device stores processor-executable programs, and the programs comprise a processing module and a sending module, wherein,
the processing module is configured to: encapsulate a particular power headroom (PH) of an activated uplink component carrier (UL CC) and a particular maximum output power of a physical channel of the activated UL CC into a same power headroom report (PHR); and
the sending module is configured to: send out the PHR;
wherein the processing module is configured to: encapsulate the particular maximum output power of the physical channel of all activated UL CCs into the PHR; and wherein,
a cell where the UL CC locates comprises a primary cell and a secondary cell;
the processing module is configured to encapsulate the particular maximum output power of the physical channel of all activated UL CCs into the PHR according to the following way:
for the activated UL CC in the primary cell, in a transmission mode that a physical uplink control channel (PUCCH) and a physical uplink shared channel (PUSCH) are transmitted at the same time, encapsulating a maximum output power of the physical channel which is used for calculating a type 1PH of the UL CC and a maximum output power of the physical channel which is used for calculating a type 2PH of the UL CC into the PHR; in a transmission mode that the PUCCH and the PUSCH are transmitted at different times, encapsulating the maximum output power of the physical channel which is used for calculating the type 1PH of the UL CC into the PHR; and
for the activated UL CC in the secondary cell, in a transmission mode that the PUCCH and the PUSCH are transmitted at the same time or at different times, encapsulating the maximum output power of the physical channel which is used for calculating the type 1PH of the UL CC into the PHR.

8. The apparatus according to claim 7, wherein,
the processing module is configured to encapsulate the particular maximum output power of the physical channel in all activated UL CCs which have data scheduling into the PHR.

9. The apparatus according to claim 8, wherein,
the processing module is configured to encapsulate the particular maximum output power of the physical channel of the UL CCs which have data scheduling into the PHR according to the following way:
for the activated UL CC in the primary cell, in the transmission mode that the PUCCH and the PUSCH are transmitted at the same time, if there is a PUSCH and/or PUCCH on the ULCC, then encapsulating the maximum output power of the physical channel which is used for calculating the type 1PH of the UL CC and the maximum output power of the physical channel which is used for calculating the type 2PH of the UL CC into the PHR; in the transmission mode that the PUCCH and the PUSCH are transmitted at different times, if there is a PUSCH on the UL CC, then encapsulating the maximum output power of the physical channel which is used for calculating the type 1PH of the UL CC into the PHR; and
for the activated UL CC in the secondary cell, in the transmission mode that the PUCCH and the PUSCH are transmitted at the same time or at different times, if there is a PUSCH on the UL CC, then encapsulating the maximum output power of the physical channel which is used for calculating the type 1PH of the UL CC into the PHR.

10. The apparatus according to claim 8, wherein,
the processing module is configured to encapsulate the particular maximum output power of the physical channel in all activated UL CCs which have data scheduling into the PHR according to the following way:
for the activated UL CC in the primary cell, in the transmission mode that the PUCCH and the PUSCH are transmitted at the same time, if there is a PUSCH and a PUCCH on the ULCC, then encapsulating the maximum output power of the physical channel which is used for calculating the type 1PH of the UL CC and the maximum output power of the physical channel which is used for calculating the type 2PH of the UL CC into the PHR; if there is only a PUSCH transmitted on the ULCC, then encapsulating the maximum output power of the physical channel which is used for calculating the type 1PH of the UL CC into the PHR; if there is only a PUCCH transmitted on the ULCC, then encapsulating the maximum output power of the physical channel which is used for calculating the type 2PH of the UL CC into the PHR; in the transmission mode that the PUCCH and the PUSCH are transmitted at different times, if there is a PUSCH on the ULCC, then encapsulating the maximum output power of the physical channel which is used for calculating the type 1PH of the UL CC into the PHR; and for the activated UL CC in the secondary cell, in the transmission mode that the PUCCH and the PUSCH are transmitted at the same time or at different times, if there is a PUSCH on the UL CC, then encapsulating the maximum output power of the physical channel which is used for calculating the type 1PH of the UL CC.

11. The apparatus according to claim 7, wherein,
the processing module is configured to respectively encapsulate the particular maximum output power of the physical channel of each UL CC after the particular PH of each UL CC when encapsulating the PHR.

12. The apparatus according to claim 7, wherein,
the processing module is further configured to encapsulate indication information of a cell state in the PHR to indicate a transmission mode of the primary cell and/or whether the secondary cell is in an activated state; and
the transmission mode comprises: the transmission mode that the PUCCH and the PUSCH are transmitted at the same time, and the transmission mode that the PUCCH and the PUSCH are transmitted at different times.

13. The method according to claim 3, further comprising:
the UE further encapsulating indication information of a cell state in the PHR to indicate a transmission mode of the primary cell and/or whether the secondary cell is in an activated state; wherein,
the transmission mode comprises: the transmission mode that the PUCCH and the PUSCH are transmitted at the same time, and the transmission mode that the PUCCH and the PUSCH are transmitted at different times.

14. The method according to claim 4, further comprising:
the UE further encapsulating indication information of a cell state in the PHR to indicate a transmission mode of the primary cell and/or whether the secondary cell is in an activated state; wherein,
the transmission mode comprises: the transmission mode that the PUCCH and the PUSCH are transmitted at the same time, and the transmission mode that the PUCCH and the PUSCH are transmitted at different times.

15. The apparatus according to claim 9, wherein,
the processing module is further configured to encapsulate indication information of a cell state in the PHR to indicate a transmission mode of the primary cell and/or whether the secondary cell is in an activated state; and
the transmission mode comprises: the transmission mode that the PUCCH and the PUSCH are transmitted at the same time, and theft transmission mode that the PUCCH and the PUSCH are transmitted at different times.

16. The apparatus according to claim 10, wherein,
the processing module is further configured to encapsulate indication information of a cell state in the PHR to indicate a transmission mode of the primary cell and/or whether the secondary cell is in an activated state; and
the transmission mode comprises: the transmission mode that the PUCCH and the PUSCH are transmitted at the same time, and the transmission mode that the PUCCH and the PUSCH are transmitted at different times.

* * * * *